No. 869,821. PATENTED OCT. 29, 1907.
R. L. WOODRUFF.
SAWMILL FEED.
APPLICATION FILED APR. 8, 1907.
2 SHEETS—SHEET 1.
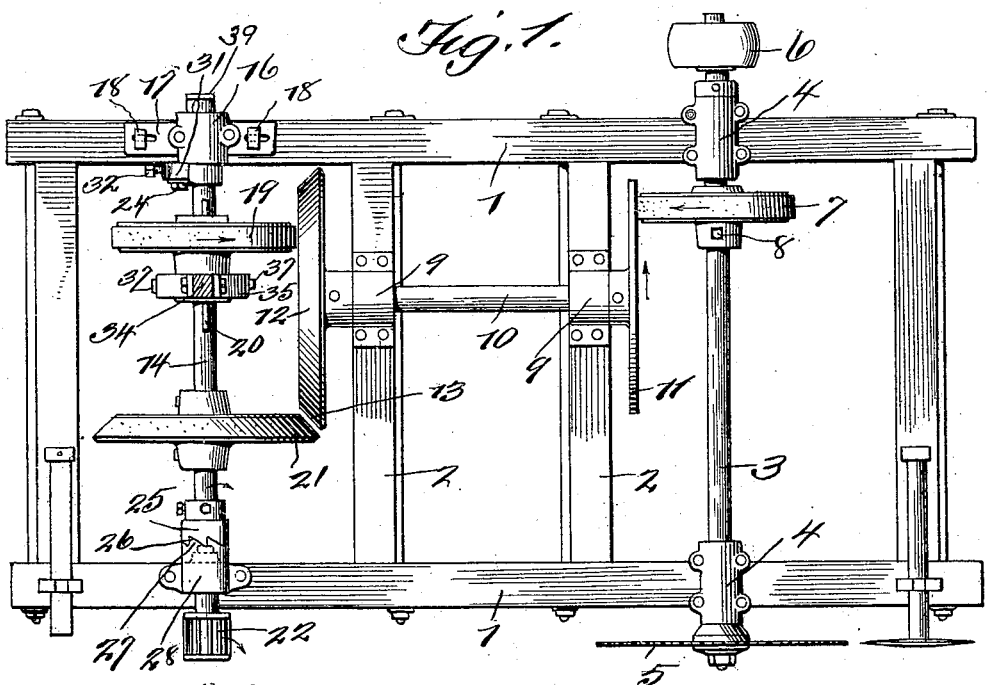

No. 869,821. PATENTED OCT. 29, 1907.
R. L. WOODRUFF.
SAWMILL FEED.
APPLICATION FILED APR. 8, 1907.
2 SHEETS—SHEET 2.
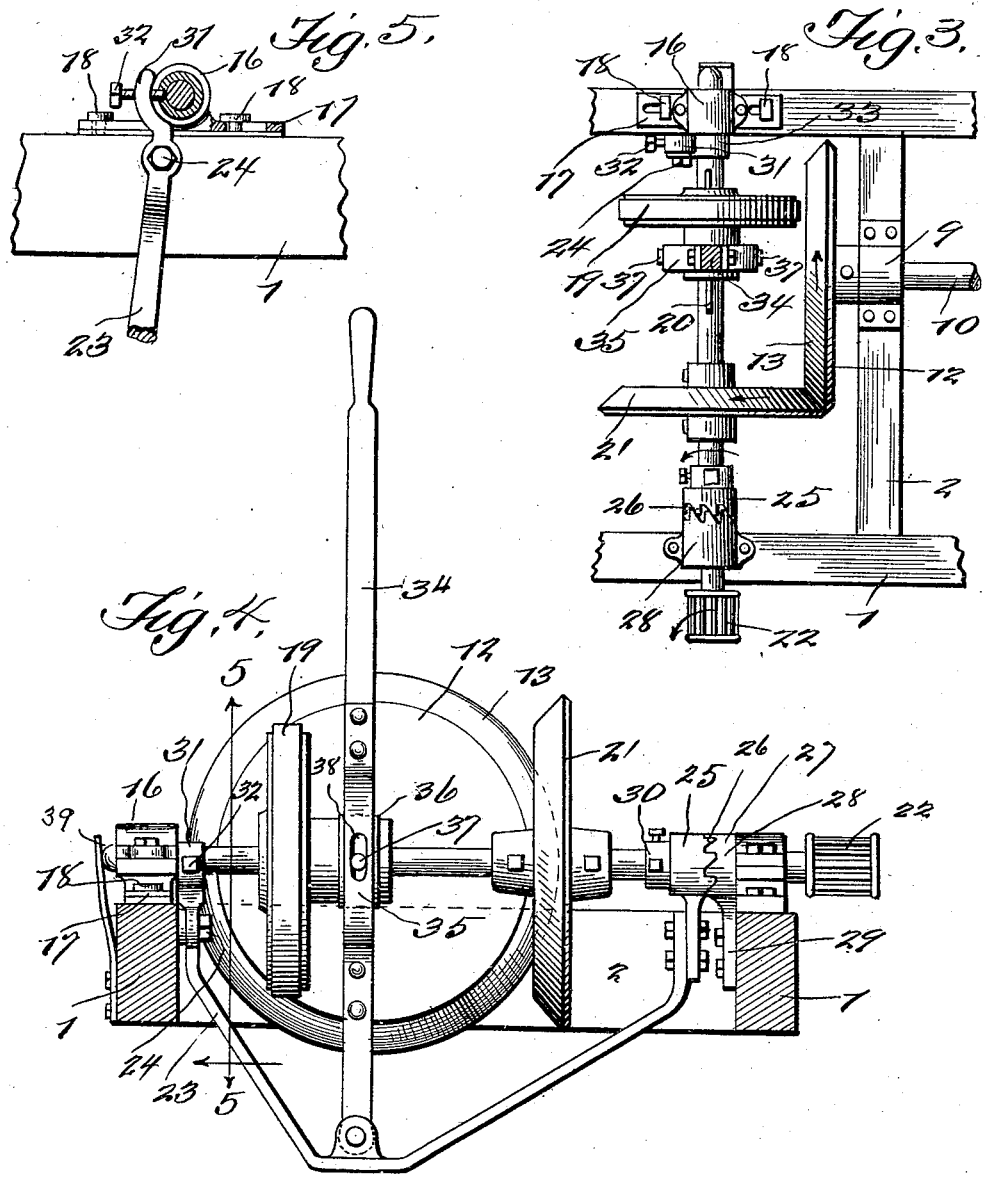

UNITED STATES PATENT OFFICE.

ROBERT LEE WOODRUFF, OF WINDER, GEORGIA, ASSIGNOR TO WOODRUFF HARDWARE & MANUFACTURING COMPANY, OF WINDER, GEORGIA.

SAWMILL-FEED.

No. 869,821.   Specification of Letters Patent.   Patented Oct. 29, 1907.

Application filed April 8, 1907. Serial No. 367,023.

*To all whom it may concern:*

Be it known that I, ROBERT LEE WOODRUFF, a citizen of the United States, residing at Winder, in the county of Jackson and State of Georgia, have invented certain new and useful Improvements in Sawmill-Feeds, of which the following is a specification.

My invention relates to improvements in sawmill feeds, and has for its object, the provision of a frictional feed mechanism for sawmill carriages which shall be simple, durable and practical in every respect.

Another object of my invention is the provision of a feed mechanism by means of which the carriage may be run at any desired speed either forward or reverse, and also to provide very simple controlling means for the feed mechanism whereby by simple muscular movements of the sawyer, the carriage may be run forward at any desired speed, stopped and reversed with but slight exertion on the operator's part.

A further object of my invention is to arrange the different members of the mechanism in such relation that they shall be balanced with respect to the pressure brought to bear on each, so that no undue wear of any of the parts shall occur, and a still further object is to reduce the working parts to a minimum so that there shall be no waste of energy.

I aim to accomplish the above results in an efficient and satisfactory manner and to the ends above set forth, my invention consists of a main driving shaft carrying a friction element thereon, a counter shaft for driving the saw carriage, frictional elements on this counter shaft, an intermediate mandrel for transmitting power from the driving shaft to the friction elements on the counter shaft, and operative means for shifting contact of the friction elements to control movements of the counter shaft and thereby the saw carriage.

The invention further consists of a feed mechanism embodying certain other novel features of construction, combination and arrangement of parts substantially as disclosed herein and as illustrated in the accompanying drawings, in which;

Figure 1, is a plan view of the complete device. Fig. 2, is a side elevation of the same, the operating handle being shown in full and dotted lines, the full lines indicating the forward position and the dotted lines indicating the still and reverse positions of the handle. Fig. 3, is a broken plan view showing the bevel friction members engaged to reverse the travel of the carriage. Fig. 4, is an end view of the device with the sills shown in section to more clearly show the controlling means. Fig. 5, is a transverse sectional view of the counter shaft on the line 5—5 of Fig. 4, to show the means for shifting the end of the shaft.

In the drawings: the numeral 1, designates the sills or side members of the supporting frame, which are connected together and braced by the cross braces 2. The main mandrel or driving shaft 3, is journaled in bearings 4, upon the sills, the shaft carrying at the one end, the usual saw 5, and having a driving pulley 6, mounted upon its opposite end for connection with a suitable source of power. A friction pulley 7, is mounted upon the driving mandrel, and it is adjustable thereon by means of a set screw 8, or other suitable fastening means. Journaled in the bearings 9, arranged upon the cross braces 2, is an intermediate power transmission shaft 10, which carries upon one end a friction disk 11, in engagement with the friction pulley on the driving or saw mandrel, and upon its opposite end, the large friction disk 12, having the beveled friction edge 13. A driven mandrel 14, is located upon the side sills at the end opposite the driving mandrel, one end of the driven mandrel being loosely journaled in the journal boxing or bracket 28, and the other end journaled in the boxing 16, having the slotted base extensions 17. Headed fastenings 18, serve to slidably secure the boxing 16, upon the sill, so that the shaft as a whole is capable of a limited lateral sliding movement.

A flat faced friction pulley 19, is slidably keyed upon the driven mandrel by means of the feather 20, which is adapted for engagement with the face of the large friction disk 12; and a bevel edged friction disk 21, of slightly larger diameter than the disk 19, is fixedly mounted on the driven mandrel and is adapted to engage the bevel edge of the large power transmission disk 12. This driven mandrel carries upon its outer free end, the spur gear 22, which is adapted for engagement with a complementary rack on the saw carriage, so that the driven mandrel serves to cause movement of the carriage.

A substantially V-shaped or depressed rock lever 23, is pivotally fulcrumed to the inner face of one of the side sills adjacent to the driven mandrel by the fulcrum stud or bolt 24, and secured to the other end of the rock lever is a tubular sleeve 25, which has a bearing upon and surrounds the shaft itself, or this bearing sleeve may as well be formed integral with the end of the depending lever. The outer face of the bearing sleeve 25, is formed with inclined cam teeth 26, which are adapted to mesh with the corresponding cam teeth 27, provided on the inner face of the tubular journal bracket or cam member 28, which surrounds the shaft and has a depending portion 29, which is secured to the inner face of the side sill as shown. An adjustable set collar 30, upon the driven mandrel serves to normally hold the movable and stationary cam members in close engagement. The opposite end of the depending pivotally suspended lever is formed with an upward curved extension 31, which extends above the fulcrum stud and has mounted therein a bolt 32, which has its inner end engaged in the loose sleeve 33, on the mandrel. In the lowermost portion of the suspended rocking member, is pivoted at 33, the base of the operating handle 34. This operating handle or lever is provided intermediate its length with the looped portion 35, which surrounds the hub of the slidable friction pulley on the mandrel. A ring or collar 36, is loosely confined upon the hub of this slidable pulley, the ring being provided with oppositely disposed studs 37, which have a bearing in the slotted portions 38, in the bowed portion of the operating lever.

The operation of the device is as follows: The main or driving mandrel is rotated in the same direction all the time, and by means of the friction pulley 7, and disk 11, motion is transmitted to the intermediate shaft 10. As the pulley 7, is adjustable upon the main mandrel, the speed of the intermediate shaft may be varied by shifting said pulley upon the mandrel. In order to cause forward movement of the carriage, the operating lever is pushed away from the operator or toward the main mandrel. This movement shifts the driven mandrel in the same direction thereby bringing the flat friction pulley 19, in contact with the larger friction disk 12, and causing forward rotation of the driven mandrel. The forward speed of the carriage may be altered by shifting the pulley 19, longitudinally upon the mandrel by means of the operating lever as will be understood. After the cut has been completed, it is desirable to cause a quick return of the carriage so as to be in readiness for the next cut. This is accomplished by the operator's drawing the operating lever toward him or away from the main mandrel, which action gives a like movement to the slidable end of the driven or carriage mandrel thereby drawing the flat friction pulley out of engagement with the large disk 12. This movement rocks the suspended lever and causes the inclined teeth on the cam members to come into action to force the cam members apart. This spreading action causes the rear face of the movable cam sleeve 25, to engage the set collar thereby forcing the shaft bodily over and causing the fixed bevel disk 21, to engage the bevel edge of the disk 12, as shown in Fig. 3, to cause reverse rotation of the driven mandrel and consequent reverse travel of the carriage. In this way the carriage is given a rapid return movement and it may be fed forward at any desired degree of speed. A spring 39, engages the outer end of the driven mandrel to force the mandrel over toward the cam members and hold the bevel friction members out of engagement. It will thus be seen that by rocking the controlling lever, the direction of travel of the carriage is governed, and the speed of travel may be altered by shifting the lever in the longitudinal plane of the shaft.

From the foregoing description taken in connection with the drawings, the operation and advantages of the invention will be readily appreciated, it will be evident that I have produced a sawmill feed which possesses all the advantages of simplicity and practicability, and one which accomplishes all the results herein set forth as the objects of the invention.

I claim:

1. A sawmill feed comprising a main mandrel and friction pulley thereon, an intermediate shaft, a disk thereon engaged by the pulley on the mandrel, a bevel edged disk on the opposite end of the intermediate shaft, a movable mandrel, a fixed bevel edge disk thereon and a relatively slidable friction pulley thereon, cam mechanism for shifting the movable mandrel longitudinally, and means for causing engagement of the clutch members to shift the shaft longitudinally to cause engagement of the bevel edge friction disks, said means also serving to cause engagement of the movable friction pulley with the friction bevel edged pulley on the intermediate shaft.

2. The combination with a driving bevel edge disk, of a laterally movable shaft, a relatively slidable friction pulley thereon and a fixed bevel edge disk thereon, a rock lever fulcrumed to shift the shaft laterally, cam members operated by said rock motion to shift the shaft longitudinally and cause engagement of the bevel edges of the friction disks, an operating lever pivoted to the rock lever to shift the slidable friction pulley on the shaft, said lever serving likewise to rock the rock lever.

3. The combination with a main mandrel, driven mandrel and frictional connecting elements between the same, speed changing and reversing elements on the driven mandrel, a rock lever pivoted to shift one end of the driven mandrel laterally to cause operative engagement of the speed changing element thereon, an operating lever pivoted to the rock lever and connected to the speed changing element to shift the same, the rock lever adapted when actuated in one direction to exert longitudinal thrust on the driving mandrel, thereby shifting the same to cause operative engagement of the reversing element thereon.

4. The combination with a driven mandrel and a driving element, a relatively slidable speed changing frictional element on said mandrel and a fixed reversing element thereon, of a rock lever adapted to shift the mandrel to cause operative engagement of the speed changing element with the driving element, an operating lever for the rock lever adapted to regulate the position of the speed changing element on the mandrel, and cam mechanism operating in conjunction with the rock lever to cause longitudinal movement of the mandrel and operative engagement of the reversing element with the driving element when the rock lever is moved a certain way.

In testimony whereof I affix my signature, in presence of two witnesses.

ROBERT LEE WOODRUFF.

Witnesses:
  W. E. AUTRY,
  S. E. SHARPTON.